(No Model.)
J. M. & H. A. REED.
MANUFACTURE OF SHOVEL BLANKS.
No. 392,135. Patented Oct. 30, 1888.
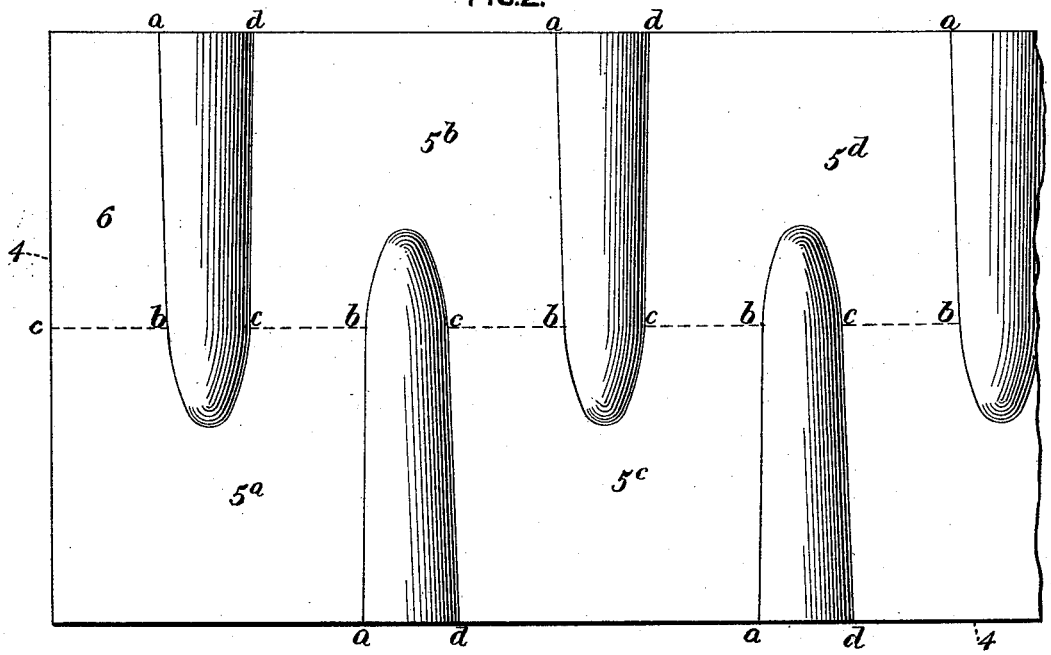
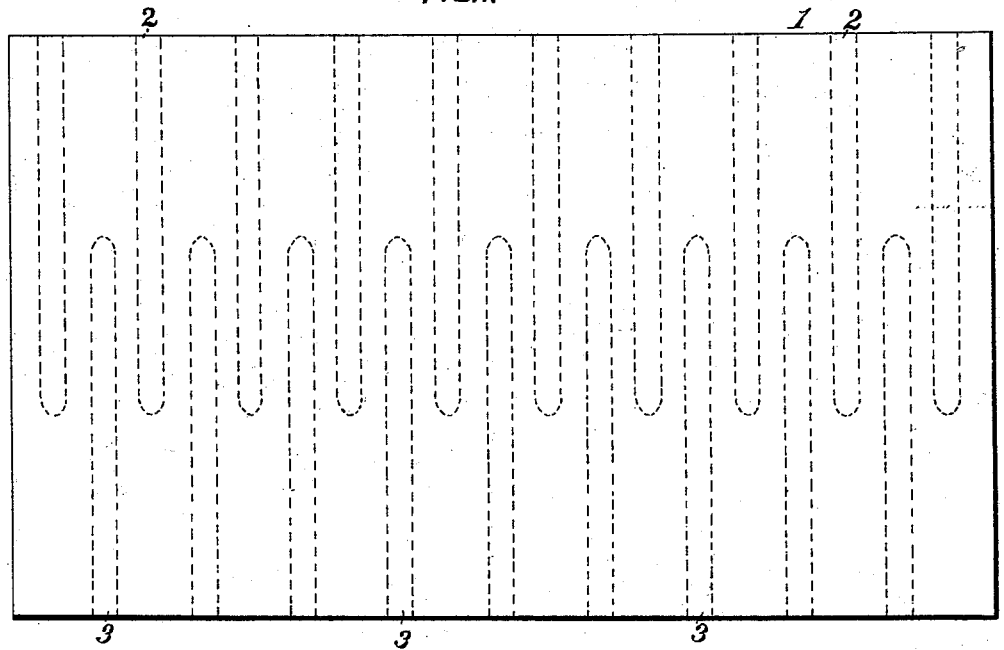
WITNESSES:
Robert D. Wilson,
F. E. Gaither.
INVENTOR,
John M. Reed.
Harry A. Reed.
by Darwin S. Wolcott
Att'y.

UNITED STATES PATENT OFFICE.

JOHN M. REED, OF BEAVER FALLS, AND HARRY A. REED, OF PITTSBURG, ASSIGNORS OF ONE-THIRD TO GILES B. BOSWORTH, OF PITTSBURG, PENNSYLVANIA.

MANUFACTURE OF SHOVEL-BLANKS.

SPECIFICATION forming part of Letters Patent No. 392,135, dated October 30, 1888.

Application filed July 30, 1888. Serial No. 281,403. (No model.)

*To all whom it may concern:*

Be it known that we, JOHN M. REED, residing at Beaver Falls, in the county of Beaver and State of Pennsylvania, and HARRY A. REED, residing at Pittsburg, in the county of Allegheny and State of Pennsylvania, citizens of the United States, have invented or discovered a certain new and useful Improvement in the Manufacture of Shovels, of which improvement the following is a specification.

In an application of even date herewith we have described and claim a method of manufacturing shovels wherein in order to avoid any material waste it was necessary to form a part of the blanks without straps, or else to weld the straps to the edges of the socket.

The object of the invention herein is to provide for the formation of straps integral with the blank, and at the same time avoid any material waste.

In the accompanying drawings, forming a part of this specification, Figure 1 is a plan of a slab, billet, or ingot having holes formed therein; and Fig. 2 is a plan view of a portion of a plate formed by reducing the ingot shown in Fig. 1.

In the practice of our invention we form, by rolling, casting, or otherwise, an iron or steel slab, ingot, or billet, 1, of suitable length and thickness, and of a width approximately equal to twice the length of the body portion of the blanks to be formed. In the opposite edges of this slab, ingot, or billet we form a series of holes, 2 and 3, said holes being of a length greater than half the width of the slab, billet, or ingot by an amount approximately equal to the depth of a socket desired in the finished shovel. As shown in Fig. 1, the holes 2 in one edge of the slab or billet alternate with the holes 3 in the opposite edge, and said holes on either edge are arranged at such a distance apart that there will be sufficient metal between two adjacent holes to produce a blank of the required width when the slab, ingot, or billet is reduced to a plate of the desired thickness, and the holes 2 and 3 are made of such diameter proportionate to the thickness of the slab, ingot, or billet as to produce a slit in the plate of a width at least equal to width of tang or strap desired in the blank. After the holes 2 and 3 have been formed as above stated the slab, ingot, or billet is reduced to a plate, 4, (see Fig. 2,) preferably by longitudinal passes through suitable rolls. Previous to rolling the slab or ingot some suitable material—as coal-slack or oxide of iron—may be placed in the holes 2 and 3, in order to prevent the walls of the holes from being welded together in the rolling operation. The plate produced as above described is next divided up into blanks 5 by cutting the plate along the lines $a\,b$, $b\,c$, and $c\,d$. This cutting of the plate may be effected by suitable shears, or by means of dies having their operative edges shaped to correspond with the three lines of cut. When employing dies for dividing the plate, the first cut is made along the lines $a\,b$ and $b\,c$, thereby cutting out the waste piece 6. The plate is then turned over, and a cut is made along the lines $a\,b$, $b\,c$, and $c\,d$, thereby cutting out a complete blank, $5^a$. The plate is again turned over, and a similar cut made, producing a blank, $5^b$. The above operation is continued until the entire plate is cut up, each cut severing a blank from the plate. It will be noticed that the cuts $a\,b$ and $c\,d$ are made along the edges of the slits, thereby separating the walls of said slits and forming two tangs or straps on each blank. It will be noticed also that the cuts $b\,c$ are so located that the inner end of each slit is left intact, such portion of the slit being adapted to form a socket in the completed shovel.

In the operation herein described a blank may be formed of such a size and thickness as to avoid the breaking down and reducing of each blank, as is now practiced, and to require only the usual shaping and finishing operations for the production of a complete shovel, thus considerably reducing the time, labor, and expense of manufacturing shovels.

We claim herein as our invention—

As an improvement in the art of manufacturing shovel-blanks having a socket and integral handle-straps, the method herein described, consisting in punching or otherwise forming a series of holes at regular intervals in opposite edges of a slab, ingot, or billet, the inner ends of the holes in one side extending beyond the inner ends of the holes in the opposite edge, rolling or otherwise reducing the slab, ingot, or billet in thickness and elongating it and transforming the holes into slits, and finally severing the plate so formed upon the lines indicated in Fig. 2 of the drawings into separate shovel-blanks, substantially as described.

In testimony whereof we have hereunto set our hands.

JOHN M. REED.
HARRY A. REED.

Witnesses:
W. B. CORWIN,
DARWIN S. WOLCOTT.